Dec. 3, 1940.  K. RABE  2,223,741
SPRINGING ARRANGEMENT
Filed Dec. 5, 1934  3 Sheets-Sheet 1
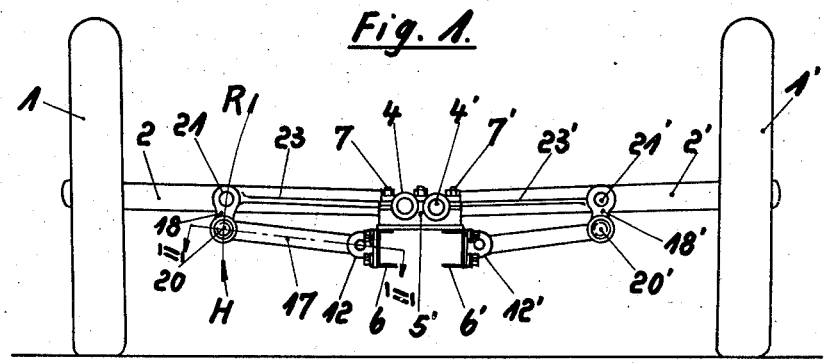
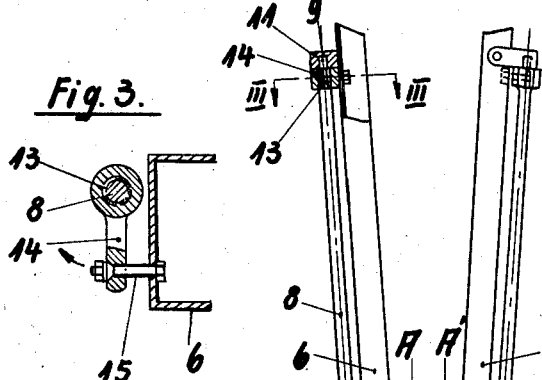
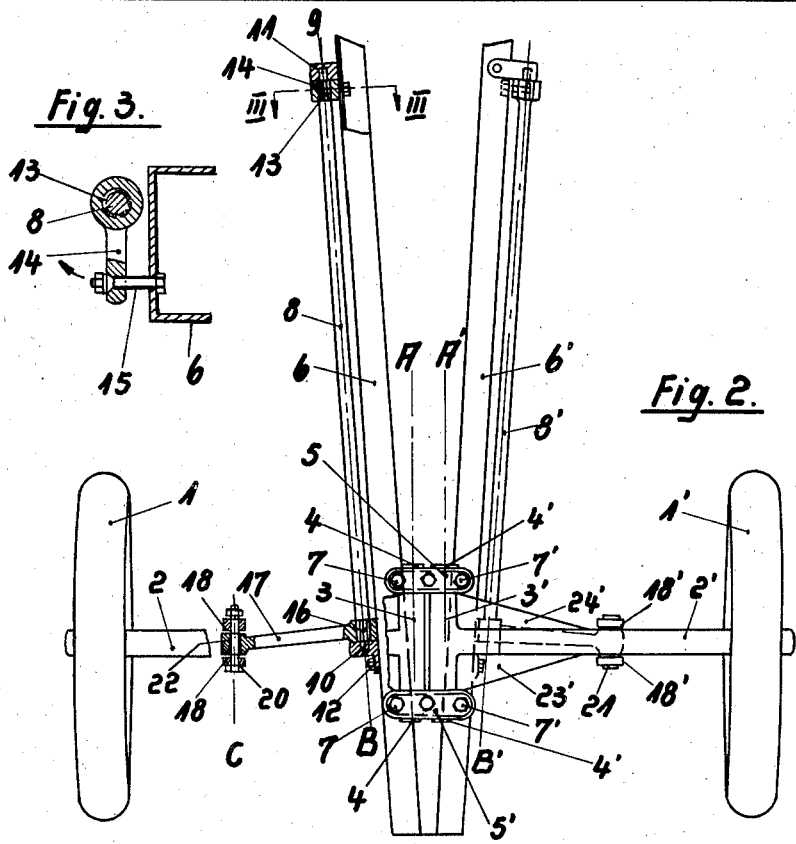
Inventor:
Karl Rabe Dec. 3, 1940.  K. RABE  2,223,741
SPRINGING ARRANGEMENT
Filed Dec. 5, 1934  3 Sheets-Sheet 2
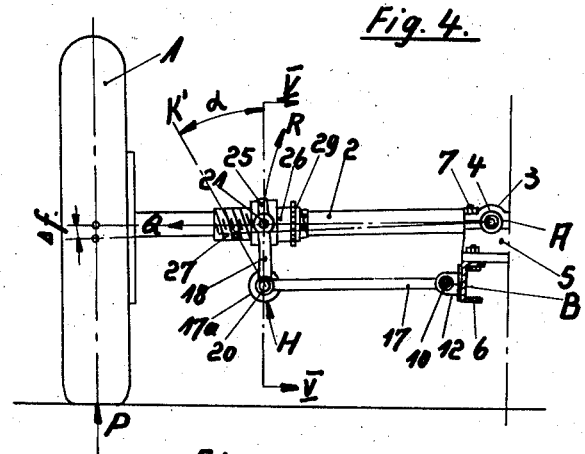
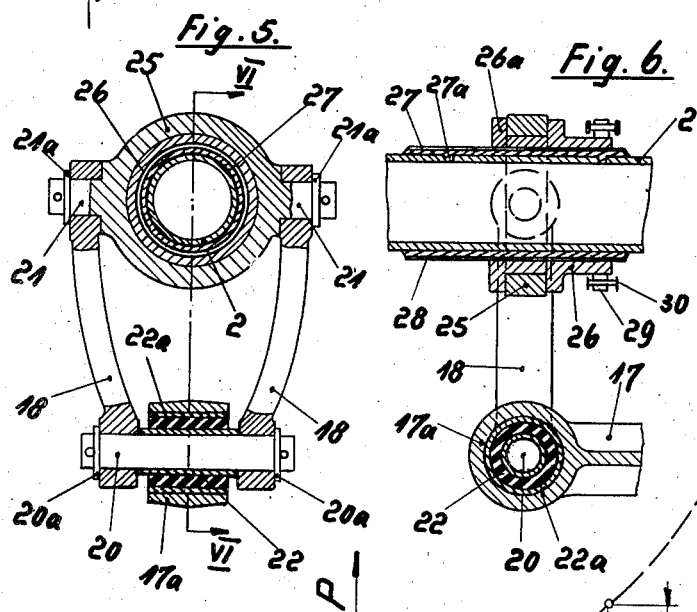
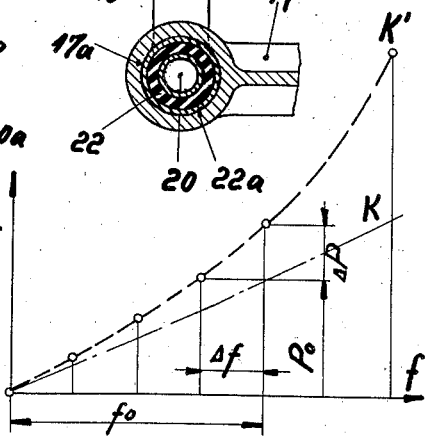
Inventor:
Karl Rabe Dec. 3, 1940.　　　　K. RABE　　　　2,223,741
SPRINGING ARRANGEMENT
Filed Dec. 5, 1934　　　3 Sheets-Sheet 3

Inventor:
Karl Rabe

Patented Dec. 3, 1940

2,223,741

UNITED STATES PATENT OFFICE 2,223,741

SPRINGING ARRANGEMENT

Karl Rabe, Stuttgart, Germany, assignor to Dr. ing. h. c. F. Porsche, K.-G., Stuttgart-Zuffenhausen, Germany, a company of Germany Application December 5, 1934, Serial No. 756,149
In Germany December 8, 1933

18 Claims. (Cl. 267—57)

The present invention relates to springing arrangements for use, for instance, in motor vehicles including such vehicles having swinging half axles, rotary spring means, such as torsion springs, being preferably employed.

It has already been proposed to spring swinging half-axles by means of torsion springs disposed in or approximately in the theoretical axis of oscillation of the wheels. This arrangement is however only possible, when the pivotal joints of the half-axles, to which the torsion springs are attached, are accessible and the space required for the desired type of spring means is not taken up by other parts such as parts of the vehicle frame. In addition, the springs must be made so easily accessible for their adjustment and renewal that they can be mounted and dismounted without any great expenditure of time and labour. This entails difficulty, more particularly when torsion bar springs are used and are disposed in or approximately in the theoretical axis of oscillation of the wheels and the axes of oscillation of the springs are placed some distance within the frame.

An object of this invention is the provision of improved springing arrangements for vehicles, as, for example, for vehicles having swinging half-axles.

Another object of this invention is the provision of spring means for vehicles, which are readily accessible for adjustment, and which may be easily mounted and dismounted.

A further object of this invention is the provision of spring means for vehicles which are linked to but do not support the wheel axle.

A still further object of this invention is the provision of novel adjustable springing means for vehicles.

Another and more particular object of this invention is the provision of springing means for vehicles having a progressive springing action.

These and other features, capabilities, and advantages of the invention will appear from the subjoined, detailed description of several illustrative embodiments thereof, illustrated in the accompanying drawings, in which:

Fig. 1 is the rear view of the half-axles which are not driven;

Fig. 2 is the plan view, partly in section along line II—II of Fig. 1;

Fig. 3 is a section along line III—III of Fig. 2, to an enlarged scale;

Fig. 4 is the rear view of a second constructional example;

Fig. 5 is a section along line V—V of Fig. 4, to an enlarged scale;

Fig. 6 is a section along line VI—VI of Fig. 5;

Fig. 7 is a diagram showing the spring characteristic;

Figure 8:
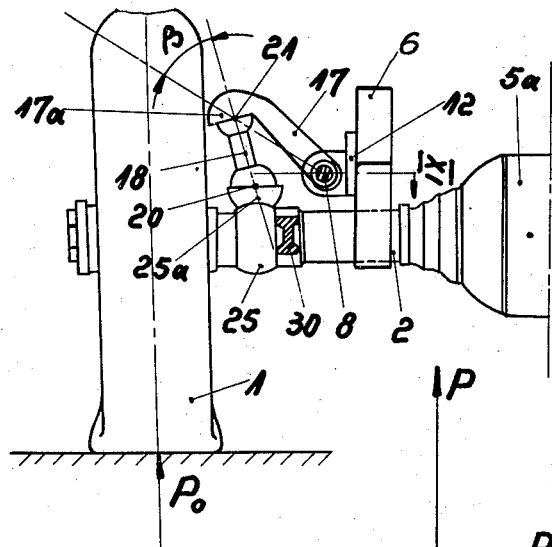
Fig. 8 is the front view of a driven half-axle, partly in section, of a third example.

In the constructional example shown in Figs. 1 to 3, the wheels 1, 1' are journalled on the half-axles 2, 2', the inner ends 3, 3' of which are provided with supporting means such as bearing journals 4, 4'. The bearing journals 4, 4' which are shown as lying parallel next to one another are jointly journalled in supporting bodies 5, 5' which are connected to the longitudinal frame members 6, 6' by means illustrated as bolts 7, 7'. At the outside of each of the rearwardly converging longitudinal frame members 6, 6', spring bars 8 and 8' respectively are disposed parallel to the said frame members, the ends 9, 10 of which may be rotatably journalled in supporting means shown as brackets 11, 12. The forward spring end 9 is connected by a fluted profile 13 or any other suitable means with a downwardly directed lever 14 which is supported with respect to the longitudinal frame member by suitable means such as a tension bolt 15 which is adjustable by means of a nut. The rear spring end 10 is connected by means such as a fluted profile 16 to a rocking lever 17 which is approximately equidirectional with the half-axle 2. The rocking lever 17 is connected by a two-part link member 18 by means of the pins 20, 21 to the half-axle 2. The lower pin 20 is journalled in the eye of the rocking lever 17 by means of an initially stressed resilient sleeve 22, for instance in the manner of a silent rubber block. The half-axle 2 is reinforced in a triangular manner between the bearing journal 4 and the pivot pin 21.

Whenever half-axle 2 swings about the axis A of the journal 4, upwards in the direction R, the rocking lever 17 is carried along in the direction H by the link member 18 in a positive manner. The rocking lever 17 swings about the axis B of the spring bar 8, approximately through the same angle as the half-axle 2. By this means the rear spring end 10 is displaced in the supporting bracket 12 with respect to the fixed forward end, so that the spring bar 8 is twisted over its entire length and a returning moment acting on the half-axle 2 is produced. As the axis B of the torsion spring is not exactly parallel to the theoretical axis of oscillation A of the wheel 1, deviations occur in the rotary paths of the pivot pins 20, 21, which are compensated by the yielding interposed sleeve 22. Such interposed sleeves make any special attention to the joints unnecessary and prevent these joints becoming knocked to pieces, owing to the unavoidable bearing inaccuracies between the half-axle 2 and the rocking lever 17. As the guiding of the wheel is effected solely by the half-axle 2, the rocking lever 17 is relieved of the guiding forces and is only subjected to the springing forces. The levers 14, 17 are mounted next to the supporting brackets 12, 11 directly on the spring bar 8, which makes their journalling easier. For regulating the initial stressing of the spring, the length of the tension bolt 15 is adjusted by the nut, an operation which can be effected under load. After the removal of the pins 21, 21' and the release of the bolts 7, 7', the half-axles 2, 2' can be removed as a complete unit. After the removal of the pin 20 and the tension bolt 15 and the release of one of the bearings 11, 12, the spring bar 8 together with the rocking lever 17 can be removed without any obstruction.

In the constructional example shown in Figs. 4 to 7, the axle tube 2 is reinforced in its middle part by a sleeve 27 which is secured with respect to the axle tube 2 by suitable means such as welded bores 27a. The sleeve 27 is shown provided with a screw thread 28 with which an internally threaded sleeve 26 engages. Between two lateral flanges 26a of the sleeve 26 a ring 25 is mounted so as to be capable of turning relative to the sleeve 26. The ring 25 is provided with means shown as two lateral gudgeons 21 on which are suspended the link members 18, secured in place by washers 21a. In the bottom link ends a pin 20 is inserted, which is secured by washers 20a. The eye 17a of the rocking lever 17 is journalled on the pin 20 with an interposed resilient block 22, such as rubber. The lever eye 17a is secured in its position with respect to the link members 18 by means of the inner bush 22a of the rubber block 22. The inner end of the sleeve 26 may be provided with a ring of teeth 29, with which a chain 30 engages, which may be carried forward as to the driver's platform and can be adjusted by the driver by suitable means (not shown).

When, as shown, the link members 18 are perpendicular to the axle tube 2, the spring characteristic for the wheel 1 will follow substantially a straight line law K. When, however, the link members 18 are inclined by the angle $\alpha$ with respect to the axle tube 2, so that they form an obtuse angle with the rocking lever 17, this characteristic will change in a positive manner and will follow a power law K'. The size of the power is directly dependent on the angle of displacement $\alpha$. Taking a given wheel pressure $P_0$, the corresponding spring path $f_0$ will, during the displacement decrease by the amount $\Delta f$, that is to say with a constant vehicle load the deflection of the half-axle 2 can be increased, or the vehicle can be raised with respect to the road surface. Starting however with a given axle position, the wheel pressure $P_0$ will, during adjustment, increase by the amount $\Delta P$, that is to say with an increasing vehicle load the position of the axle can be kept unchanged. Thus, with this arrangement a balance between the vehicle load and the position of the vehicle can be obtained according to the given circumstances.

The sleeve 26 can be displaced in the following manner: from the driver's platform the sleeve 26 is turned by the chain 30 through a suitable arrangement, the sleeve 26 being displaced in a positive manner on the axle tube 2 along with the ring 25 in the direction Q, that is to say towards the wheel 1. The ring 25 is secured against being carried along through the link members 18 by the rocking lever 17, so that the link members 18 can turn on the journals 20, 21 and adopt an inclined position with respect to the axle tube 2. If the thread 28 should be made self-locking, the lateral forces produced by the inclination of the link members 18 will be transmitted directly from the thread 28 by way of the sleeve 27 to the axle tube 2. Although the lateral forces increase as the angle of displacement increases, they are nevertheless so small in the range of displacement required that there can be no appreciable influencing of the springing through increase in the frictional forces. The chain end 30 engaging in the ring of teeth takes part in this adjusting movement and also in the swinging movement of the sleeve 26, and it is therefore necessary to provide for this motion, for instance, by making the chain of a suitable length, so that there shall be no influencing of the springing as well.

Figure 10:
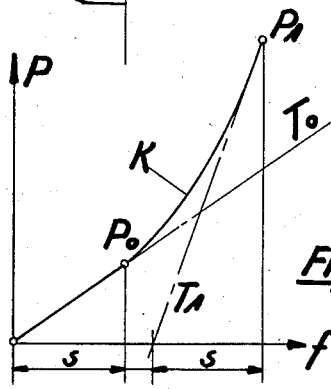
Fig. 10 is a diagram showing the corresponding spring characteristic.
Figure 9:
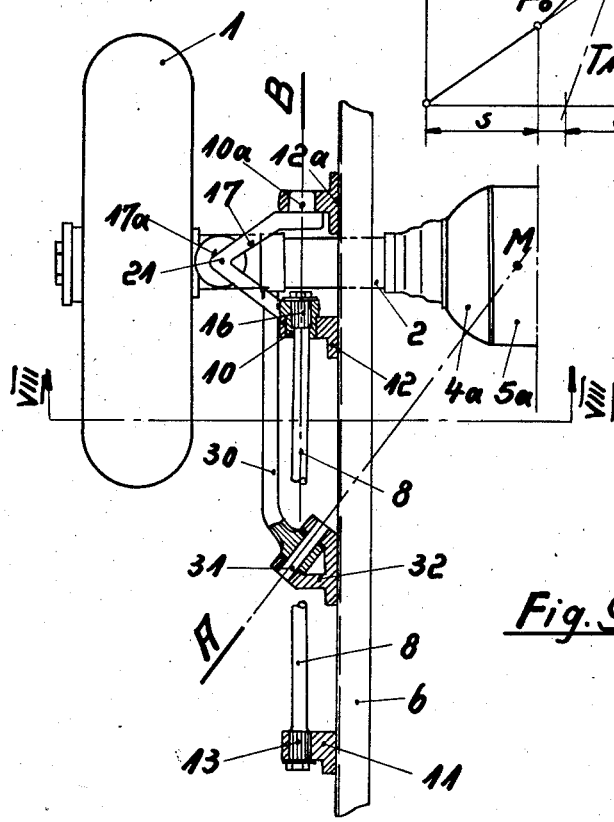
Fig. 9 is the plan view, partly in section along line IX of Fig. 8.

In the constructional example shown in Figs. 8 to 10, the half-axle 2 supporting the wheel 1 is journalled, as with a ball and socket arrangement, in the cover 4a of the axle casing 5a so as to turn about the point M. The half-axle 2 is connected with a forwardly extending swinging strut 30 which is pivotally attached by means illustrated as a pin 31 in the bearing bracket 32 of the longitudinal frame member 6. The axis A of the pivot pin 31 passes through the centre point M of the axle joint. The half-axle 2 is provided with a socket 25 which has a spherical cup 25a which is open to the top. At the outside of the longitudinal frame member 6 a spring bar 8 is disposed parallel to the same. Its forward end engages the supporting journal 10 of a forked rocking lever 17 by means shown as a fluted profile 16, while its rear end is connected to the supporting bracket 11 of the longitudinal frame member 6 by similar means 13. The supporting journals 10, 10a of the rocking lever 17 are journalled in brackets 12, 12a which are connected to the longitudinal frame member 6 at either side of a cranked part of the frame member, which enables the half-axle 2 to swing. The outer end of the rocking lever 17 supports a spherical cup 17a which is open to the bottom. In the spherical cups 17a, 25a is disposed a compression member 18 provided with spherical ends 20, 21 through which the rocking lever 17 is supported on the half-axle 2.

The link members 17, 18 which with the half-axle 2 form a link quadrilateral are placed so as to incline outwards and form with one another an acute angle $\beta$. Through the inclined position of the two link members 17, 18 a relatively great progressive action can be obtained even with moderate angles of inclination. This progressive action has the advantage that it secures equally soft springing at all loads. On the wheel 1 springing, the wheel pressure increases, for instance by a power $e$. The hardness of the spring, the amount of which is indicated in Fig. 10 by the inclination of the tangent T, is in each case proportional to the wheel pressure P. This is indicated by the sub-tangents S for the points $P_0$ and $P_1$ of the characteristic K being equal.

The points $P_0$ and $P_1$ suitably correspond to the wheel pressures with an unloaded and fully loaded vehicle. When swinging the wheel 1 swings about the axis A, the rocking lever 17 swings about the axis B, so that the paths of the centres of the spheres 20, 21 in each case lie in different planes. Through the self-adjustment of the compression member 18 over its spherical ends 20, 21, these deviations are compensated in a positive manner. Lack of accuracy in the bearings due to distortion of the chassis may also be compensated in this way, so that this springing arrangement is specially suitable for heavy goods vehicles.

As regards the essence of the invention it is immaterial, whether the wheels journalled on the half-axles are driven or not. The invention may with advantage be applied to all kinds of swinging half-axles, irrespective of whether they are mounted in pin or ball and socket joints and are supported by swinging struts or not. It is also immaterial as regards the essence of the invention, how the torsion springs are disposed with respect to the half-axles, as the way they are journalled depends on the particular construction of the chassis. Thus the torsion springs may be disposed either above or below and either on the outside or the inside of the half-axles, so that the link members connected to them may form closed or open, two-dimensional or three-dimensional link quadrilaterals with the half-axle. The type of rotary spring means employed is also immaterial as regards the essence of the invention. Many modifications of the constructional examples are possible. Thus, for instance, all the pin joints of the link members 18 may be provided with rubber blocks 22. With a sleeve 27 of suitable length the link members 18 may be placed at an inclination in both directions to the vertical central position. In place of the chain actuation for the socket 26 any other adjusting device may be used, for instance adjustment by hand. For the compression member 18 a tension member may be substituted. When the torsion spring is disposed below, the spherical ends 20, 21 of which must then be held in the bearing cups 17a, 25a. Furthermore, the terms "frame" or "chassis" as used herein are not to be construed as limited to a construction separate from the vehicle body, but to include those cases in which the "chassis" or "frame" is integral with such body.

It will be seen that I have provided a construction which satisfies the objects enumerated above, and while I have shown the invention in certain physical embodiments, it is to be understood that modifications of the structure shown may be made by those skilled in this art without departing from any invention as expressed in the following claims.

What I claim is:

1. Spring supporting means for vehicle chassis comprising a wheel supporting axle connected to the chassis for movement with respect thereto, rotary spring means, and a connection between said spring and axle through which the reaction force of the spring is applied to the axle, said connection being independent of the wheel supporting axle and comprising means articulated to said axle.

2. Spring means for vehicle chassis comprising a wheel supporting axle pivotally secured to the chassis, rotary spring means carried by the chassis, and connecting means through which the reaction force of the spring is applied to said axle, said connecting means being independent of the wheel supporting axle and being articulated to said axle.

3. Spring supporting means for vehicle chassis comprising a wheel supporting axle movably supported by said chassis for oscillation about a fixed axis, rotary spring means mounted upon the chassis for rotation about an axis inclined to the axis about which said axle is movable, and connecting means between said spring means and said axle.

4. Spring supporting means for vehicle chassis comprising a wheel supporting axle movably supported by said chassis for oscillation about a fixed axis, rotary spring means mounted upon the chassis for rotation about an axis inclined to the axis about which said axle is movable, and universal joint connecting means between said spring means and said axle.

5. Spring supporting means for vehicle chassis comprising a wheel supporting axle movably supported by said chassis for oscillation about a fixed axis, rotary spring means mounted upon the chassis for rotation about an axis inclined to the axis about which said axle is movable, and articulated connecting means between said spring means and said axle.

6. Spring supporting means for vehicle chassis comprising a wheel supporting axle secured to the chassis for movement with respect thereto, and rotary spring means, a resilient connection between said spring and axle through which the reaction force of the spring is applied to the axle, said connection comprising means articulated to said axle, and said articulated means comprising an arm connected with said spring means and a link connected to said arm and to said axle.

7. Spring supporting means for vehicle chassis comprising a wheel supporting axle secured to the chassis for movement with respect thereto, rotary spring means, and a connection between said spring and axle through which the reaction force of the spring is applied to the axle, said connection comprising means articulated to said axle, and said articulated means comprising an arm connected with said spring means and a link connected to said arm and to said axle by universal joints.

8. Spring supporting means for vehicle chassis comprising a wheel supporting axle pivotally secured to the chassis, rotary spring means carried by the chassis, and connecting means through which the reaction force of the spring is applied to said axle, said connecting means being so constructed and arranged that the angular velocity ratio between the spring means and the axle changes as the spring deflection changes.

9. Spring supporting means for vehicle chassis comprising a wheel supporting axle pivotally secured to the chassis, rotary spring means carried by the chassis, and connecting means through which the reaction force of the spring is applied to said axle, said connecting means being so constructed and arranged that the angular velocity ratio between the spring means and the axle increases as the spring deflection increases.

10. Spring supporting means for vehicle chassis comprising a wheel supporting axle pivotally secured to the chassis, rotary spring means carried by the chassis, and resilient connecting means through which the reaction force of the spring is applied to said axle, said connecting means together with said axle and chassis forming a link quadrilateral.

11. The combination as claimed in claim 1, wherein the rotary spring means comprises a torsion bar.

12. The combination as claimed in claim 3, wherein the rotary spring means comprises a torsion bar.

13. Spring supporting means for vehicle chassis comprising a wheel supporting axle pivotally secured to the chassis, spring means carried by the chassis, and connecting means through which the reaction force of the spring is applied to said axle, one element of said connecting means being oscillatable in a plane other than that in which the axle oscillates, and another element thereof being connected by universal joint connections to said first element and to said axle.

14. The combination as claimed in claim 10, wherein the rotary spring means comprises a torsion bar and includes means for adjusting the reaction of said torsion bar upon the axle.

15. In a wheel springing mechanism for vehicles having a frame, in combination, a wheel supporting axle pivoted to said frame about a fixed axis, spring means mounted upon the frame for rotation about an axis inclined to the axis about which said axle is movable, an arm connected to said spring means, and linkage means connecting said arm to said axle, the angle between said arm and said link being determined by the load on the vehicle and being a measure of the strength of the springing.

16. Spring supporting means for a vehicle chassis comprising a wheel supporting axle supported by the chassis for movement with respect thereto, rotary spring means, and a resilient connection between said spring and axle through which the reaction force of the spring is applied to the axle, said connection being independent of the axle supporting means and comprising means articulated to said axle.

17. The combination according to claim 15 in which said arm comprises a forked member, one leg of which is connected to the spring means, the other leg of which is rotatably carried by the frame, and the apex of which is connected to the linkage means.

18. In a wheel springing mechanism for vehicles having a frame, in combination, a wheel supporting axle, an arm having a pair of spaced extensions, one extension being provided at its end with an interconnected hollow bushing, means for journaling said bushing on said frame, means for journaling the other extension on said frame co-axially with said journaled bushing, a torsion rod rigidly interconnected at one end to said bushing and at its other end to said frame for rotation about an axis co-axial with the journaled extensions of said arm, and means for articulating said arm to said wheel supporting axle.

KARL RABE.